US011894693B2

(12) United States Patent
Landis et al.

(10) Patent No.: US 11,894,693 B2
(45) Date of Patent: Feb. 6, 2024

(54) POWER HARVESTING PROTOCOL FOR CONFIGURABLE METASURFACES IN A WIRELESS WIDE AREA NETWORK (WWAN)

(71) Applicant: QUALCOMM Incorporated, San Diego, CA (US)

(72) Inventors: Shay Landis, Hod Hasharon (IL); Yehonatan Dallal, Kfar Saba (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/327,634

(22) Filed: May 21, 2021

(65) Prior Publication Data

US 2022/0376555 A1 Nov. 24, 2022

(51) Int. Cl.
*H02J 50/20* (2016.01)
*H02J 50/00* (2016.01)
(Continued)

(52) U.S. Cl.
CPC ............ *H02J 50/20* (2016.02); *H02J 50/001* (2020.01); *H04W 72/23* (2023.01); *H04W 72/51* (2023.01)

(58) Field of Classification Search
CPC . H02J 5/005; H02J 7/025; H02J 17/00; H01F 38/14; B60L 11/182
(Continued)

(56) References Cited

U.S. PATENT DOCUMENTS 1,042,372 A * 10/1912 Harris ..................... H01B 17/24
174/157
11,317,416 B2 * 4/2022 Gordaychik .............. H04L 1/08
(Continued)

FOREIGN PATENT DOCUMENTS

| EP | 2782209 A1 | 9/2014 |
| EP | 3148052 A1 | 3/2017 |
| KR | 20190073056 A | 6/2019 |

OTHER PUBLICATIONS

International Search Report and Written Opinion—PCT/US2022/028214—ISA/EPO—dated Sep. 30, 2022 (208779WO).

*Primary Examiner* — Quan Tra
(74) *Attorney, Agent, or Firm* — Arun Swain

(57) ABSTRACT

This disclosure provides systems, methods, and apparatus, including computer programs encoded on computer-readable media, for implementing a power harvesting protocol at a network entity and a channel engineering device (CED) of a wireless communication network. In some aspects, the network entity and the CED may implement a power harvesting protocol that includes power harvesting capabilities and configuration signaling to support power harvesting at the CED. The CED may provide a power harvesting capabilities message to the network entity that includes a parameter that indicates capabilities for power harvesting at the CED. The network entity may respond with a power harvesting configuration message to configure the CED for power harvesting. After configuration of the CED, the network entity may transmit dedicated and non-dedicated (or opportunistic) power harvesting signals to the CED for use by the CED for power harvesting. The dedicated and non-dedicated power harvesting signals may be periodic or aperiodic.

30 Claims, 9 Drawing Sheets

(51) Int. Cl.
*H04W 72/23* (2023.01)
*H04W 72/51* (2023.01)

(58) Field of Classification Search
USPC .......................................................... 307/104
See application file for complete search history.

(56) References Cited

U.S. PATENT DOCUMENTS

| | | | |
|---|---|---|---|
| 2012/0212071 A1* | 8/2012 | Miyabayashi | H02J 50/05 |
| | | | 307/104 |
| 2019/0158162 A1 | 5/2019 | Ryu et al. | |
| 2019/0349864 A1* | 11/2019 | Zhang | H04W 52/16 |
| 2019/0356177 A1* | 11/2019 | Swan | H02J 50/10 |

* cited by examiner

POWER HARVESTING PROTOCOL FOR CONFIGURABLE METASURFACES IN A WIRELESS WIDE AREA NETWORK (WWAN)

TECHNICAL FIELD

Aspects of the present disclosure relate generally to wireless communication and to techniques for implementing a power harvesting protocol for configurable metasurfaces of channel engineering devices (CEDs) in a wireless wide area network (WWAN).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One aspect of the subject matter described in this disclosure can be implemented in a method for wireless communication performed by an apparatus of a network entity. The method may include receiving a power harvesting capabilities message from a CED, and transmitting a power harvesting configuration message associated with the power harvesting capabilities message to the CED. The power harvesting configuration message may indicate timing information associated with power harvesting signals used by the CED for power harvesting.

In some implementations, the power harvesting configuration message may further indicate frequency information associated with the power harvesting signals transmitted to the CED by the network entity to perform power harvesting at the CED.

In some implementations, the method may include receiving one or more parameters associated with power harvesting. The one or more parameters may be included in the power harvesting capabilities message and may indicate capabilities for power harvesting at the CED. The method may include generating the power harvesting configuration message based, at least in part, on the one or more parameters associated with power harvesting.

Another aspect of the subject matter described in this disclosure can be implemented in a method for wireless communication performed by an apparatus of a CED. The method may include transmitting a power harvesting capabilities message to a network entity. The power harvesting capabilities message may indicate capabilities for power harvesting at the CED. The method may include receiving a power harvesting configuration message from the network entity, and configuring the CED for power harvesting signals associated with the power harvesting configuration message.

In some implementations, the power harvesting configuration message may indicate timing information and frequency information associated with the power harvesting signals received from the network entity to perform power harvesting at the CED.

In some implementations, the method further includes receiving one or more of the power harvesting signals associated with the power harvesting configuration message from the network entity, and commencing power harvesting at the CED.

Another aspect of the subject matter described in this disclosure can be implemented in an apparatus of a network entity for wireless communication. The apparatus of the network entity may include one or more processors configured to implement a power harvesting protocol. The apparatus of the network entity may include one or more interfaces configured to receive a power harvesting capabilities message from a CED, and transmit a power harvesting configuration message associated with the power harvesting capabilities message to the CED. The power harvesting configuration message may indicate timing information associated with power harvesting signals used by the CED for power harvesting.

Another aspect of the subject matter described in this disclosure can be implemented in an apparatus of a CED for wireless communication. The apparatus of the CED may include one or more interfaces configured to transmit a power harvesting capabilities message to a network entity. The power harvesting capabilities message may indicate capabilities for power harvesting at the CED. The one or more interfaces may be configured to receive a power harvesting configuration message from the network entity. The apparatus of the CED may include one or more processors configured to configure the CED for power harvesting signals associated with the power harvesting configuration message.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
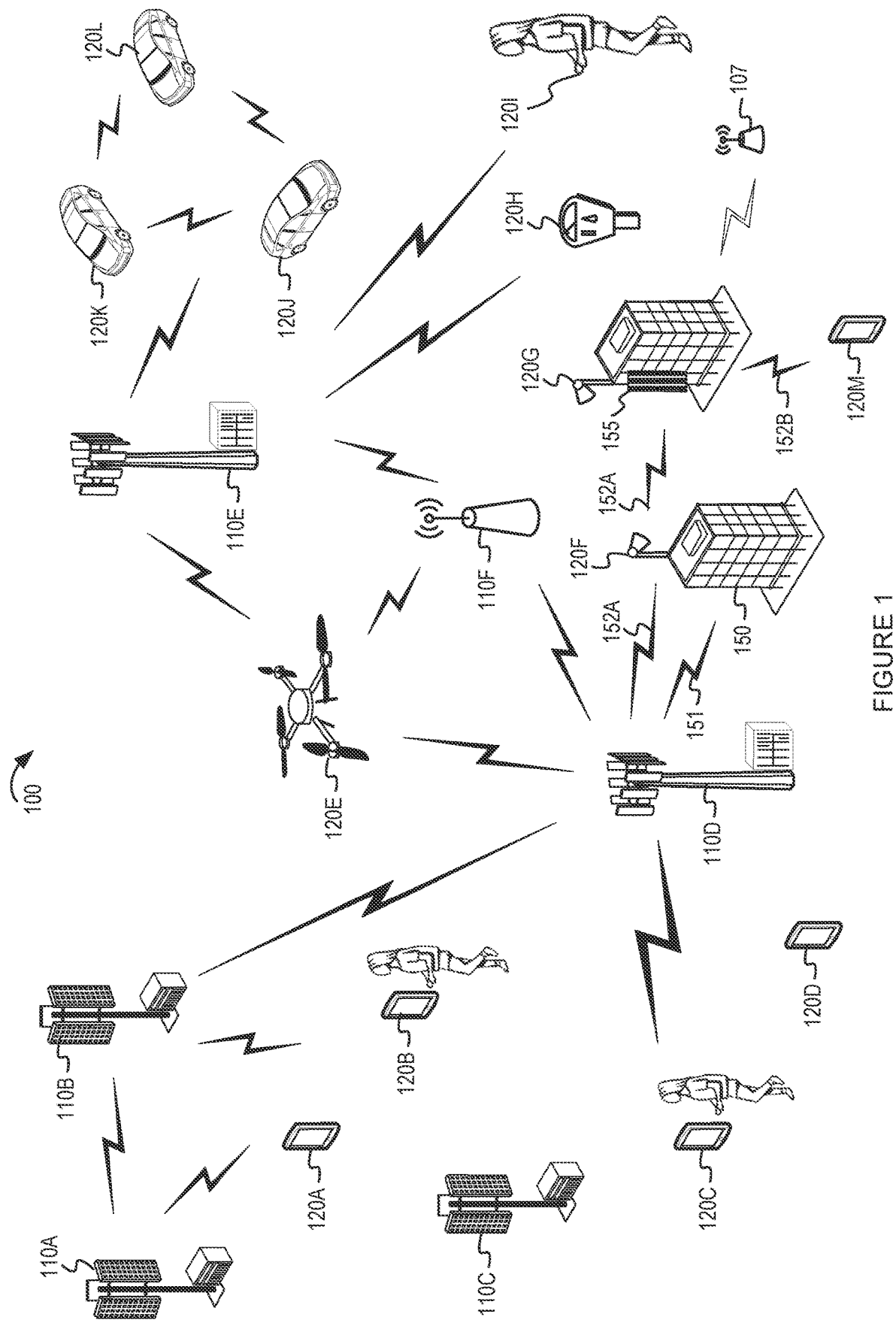
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A user equipment (UE) of the wireless communication network may use the 5G NR RAT or the LTE RAT depending on which wireless coverage is available to the UE and which wireless coverage provides the best quality service.

The 5G NR RAT may be designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) and sub-terahertz (sub-THz) bands. UEs and BSs that implement the 5G NR RAT may include multiple antennas and may support efficient beamforming with good spatial separation between the various beams. The UEs and BSs may utilize the various beams for communication purposes.

In some aspects, the wireless communication network may include one or more channel engineering devices (CEDs) installed in or on various structures. A mainly reflective CED also may be referred to as an intelligent reflective surface (IRS). The one or more CEDs may be used to extend the coverage area of the BSs and the UEs. In some aspects, an obstacle, such as a building, may be located between a BS and a UE and thus may interfere with a signal transmitted by a BS from reaching a UE via a line-of-sight (LOS) transmission. In some aspects, the BS may configure a CED to extend the coverage area of the BS by circumventing the obstacle. For example, the BS may provide one or more configuration settings to the CED. The CED may apply the one or more configuration settings to control in which direction a metamaterial of the CED directs received signal energy. For example, the metamaterial of the CED may reflect signal energy of a signal received from the BS such that the reflected signal reflects towards the direction of the UE and circumvents the obstacle.

The CEDs can be connected to the power grid or are disconnected from the power grid. The CED deployments that connect the CEDs to the power grid may be limited by the existing power grid infrastructure or the cost of adding new connections to the existing power grid. The CEDs that are disconnected from the power grid typically use alternative power sources, such as solar power or battery power. CEDs may use both solar power and battery power as alternative power sources. For example, a CED may use battery power as a backup when solar power is not available. Adding alternative power sources to CEDs increases the cost and the complexity of the CEDs. The CED deployments that do not connect the CEDs to the power grid are not limited by the existing power grid infrastructure.

In some implementations, the BSs and the CEDs of the wireless communication network may implement a power harvesting protocol that includes power harvesting capabilities and configuration signaling to support power harvesting at the CEDs. The power harvesting capabilities and configuration signaling may include a CED providing a power harvesting capabilities message to one or more BSs, and the BSs responding with a power harvesting configuration message to configure the CED for power harvesting. After configuration of the CED, the BSs may transmit dedicated and non-dedicated (which also may be referred to as opportunistic) power harvesting signals to the CED that will be used by the CED for power harvesting.

In some implementations, the CED may determine one or more parameters that indicate the power harvesting capabilities of the CED. For example, the one or more parameters may include one or more of a frequency parameter, an angle parameter, an aperture size parameter, and a duty cycle parameter. The CED may provide a power harvesting capabilities message to the BS that includes the one or more parameters. The BS may receive and process the power harvesting capabilities message. In some implementations, based on the power harvesting capabilities message, the BS may determine timing information and frequency information associated with the power harvesting signals the BS will transmit to the CED for power harvesting. In some implementations, the BS may transmit a power harvesting configuration message to the CED that indicates the timing information and the frequency information. The power harvesting configuration message may configure the CED to receive the power harvesting signals at certain times and via certain frequencies to perform the power harvesting at the CED.

In some implementations, after configuring the CED with the power harvesting configuration message, the BS may transmit the power harvesting signals to the CED in accordance with the timing and frequency information provided to the CED. The power harvesting signals provided to the CED may include dedicated power harvesting signals and non-dedicated (or opportunistic) power harvesting signals. The dedicated power harvesting signals may be transmitted to the CED for the sole purpose of power harvesting at the CED. The non-dedicated (or opportunistic) power harvesting signals may be signals that are transmitted for purposes other than power harvesting, but the CED may opportunistically receive the signals and absorb the signal energy to perform power harvesting at the CED. In some implementations, the power harvesting signals may be periodic or aperiodic. In some implementations, the CED may receive the power harvesting signals from the BS at the time and via the frequency indicated by the power harvesting configuration message. The metamaterial of the CED may absorb the signal energy associated with the received power harvesting signals and perform the power harvesting.

Particular implementations of the subject matter described in this disclosure can be implemented to realize one or more of the following potential advantages. Since CEDs are passive devices with nominal power requirements, performing power harvesting at the CED by absorbing signal energy of power harvesting signals received by the CED may allow CED deployments that are not connected to the power grid. The BSs and the CEDs of the wireless communication network implementing a power harvesting protocol that includes power harvesting capabilities and configuration messages may allow the CEDs to harvest power from both dedicated and non-dedicated (or opportunistic) power harvesting signals. The power harvesting capabilities and configuration messages that are exchanged between the BSs and the CEDs may allow the coordination and configuration between the BSs and the CEDs to perform power harvesting at the CEDs. Performing power harvesting at the CEDs and implementing the power harvesting protocol may substantially reduce the cost of CED deployments and may substantially reduce the use of alternative power sources by the CEDs. Reducing the use of alternative power sources by the CEDs also may reduce the maintenance and replacement costs associated with the alternative power sources of the CEDs. Furthermore, by not being limited to the power grid, the CEDs may be relocated with ease depending on the network demand. For example, during events that typically result in increased network demand and reduced network performance (such as sporting events, parades, conventions, among others), CEDs can be relocated to (or near) the location of the events to improve the network performance.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

ABS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. In some aspects, the BSs 110D and 110E also may be enabled with 3D, FD, or massive MIMO. ABS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D and 120M are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C, 120D, and 120M. Such multicast services may include mobile television or stream video, or may include other services for providing community information, such as weather emergencies or alerts, such as Amber alerts or gray alerts. In some aspects, the BS 110D also may use 3D beamforming and coordinated spatial techniques.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

In some aspects, a BS 110 (such as BS 110D) may communicate with one or more UEs 120 (such as UE 120M) in a coverage area using one or more directional beams. An obstacle 150, such as a building, may interfere with a signal transmitted by the BS 110 from reaching a destination via a line-of-sight (LOS) transmission. For example, the obstacle 150 may be between the BS 110D and the UE 120M, and thus may interfere with a LOS transmission 151 from the BS 110D to the UE 120M. In some cases, based on the obstacle 150, the BS 110D may configure a channel engineering device (CED) 155 to extend the coverage area by circumventing the obstacle 150. The CED 155 may be installed in a structure, such as a building, bridge, or utility pole. For example, the CED 155 may include a metamaterial, and the BS 110D may configure one or more deflection settings of the CED 155. The CED 155 may apply the one or more deflection settings to electronically control in which direction the metamaterial directs received signal energy. For example, the metamaterial of the CED 155 may focus received signal energy (such as focusing refraction), reflect received signal energy, refract received signal energy, filter received signal energy, or any combination to enhance a communication link between the BS 110D and the UE 120M. For example, the BS 110D may configure the CED 155 to reflect signal energy from a transmission 152A such that the reflected transmission 152B reflects towards the direction of the UE 120M and circumvents the obstacle 150.

In some aspects, the BS 110D may configure a CED 155 with a beam shaping configuration for modifying a directional beam used by BS 110D, one or more UEs 120 (such as UE 120M), or a combination for communications. For example, the CED 155 may receive control signaling that triggers the CED 155 to perform an angular measurement for one or more angular settings calculations. The BS 110D may perform the deflection (or angular) settings calculation periodically for tracking the mobility of the one or more UEs 120 (such as the UE 120M). After performing the angular setting calculation, the BS 110D may configure the CED 155 with appropriate deflection parameters (such as reflection parameters) to be later applied in an operational mode.

In some aspects, the BS 110D may transmit the deflection settings calculation to the CED 155 in control signaling. The deflection settings calculation may be included in a beam shaping configuration. In some aspects, the beam shaping configuration may include one or more parameters that modify the one or more deflection settings at the CED 155 to adjust the metamaterial of the CED 155 to focus received signal energy, reflect received signal energy, refract received signal energy, filter received signal energy, or any combination. In some aspects, the BS 110D and the one or more UEs 120 (such as the UE 120M) may communicate using the CED 155 based on the beam shaping configuration, which may circumvent obstacles, reduce power consumption, bandwidth, distance between the one or more UEs 120 and the BS 110D, and cost among other advantages (such as cost when compared with using a repeater).

In some aspects, a CED (such as the CED 155) may be a passive device and may have nominal power requirements. For example, a CED may be implemented to only consume power at reconfiguration (such as when a deflection setting is reconfigured) and communication of telemetric and commands with a BS (such as BS 110D). In some aspects, a metamaterial of a CED may include specular reflectors, refractors, or both, to extend coverage to areas which are otherwise not covered. Both reflectors and refractors also may have a focusing, or energy concentration, effect to further enhance a communication link. In some aspects, when a BS configures the metamaterial of the CED to direct signal energy in a desired direction, the metamaterial may affect electromagnetic waves that interact with the structural features of the metamaterial to direct the signal energy in the desired direction. For example, the metamaterial may affect electromagnetic waves that impinge on or interact with its structural features, which are smaller than a wavelength of the electromagnetic waves. In some aspects, to behave as a homogeneous material accurately described by an effective refractive index, the structure features of the metamaterial may be much smaller than the wavelength of the electromagnetic waves. In some aspects, the metamaterial may include a grid of unit cells as the structural features, where each unit cell includes a tunable split ring resonator (SRR) and each unit cell is smaller than the wavelength of the electromagnetic waves. In some aspects, the CED may apply a beam shaping configuration based on receiving control signaling from the base station that indicates one or more deflection settings to tune some or all of the SRRs to modify the effective refractive index of the metamaterial. In some aspects, the one or more deflection settings may control how one or more of the unit cells interact with one or more electromagnetic waves of a received signal to deflect the one or more electromagnetic waves in a desired manner (such as reflecting or refracting toward a receiver).

Figure 2:
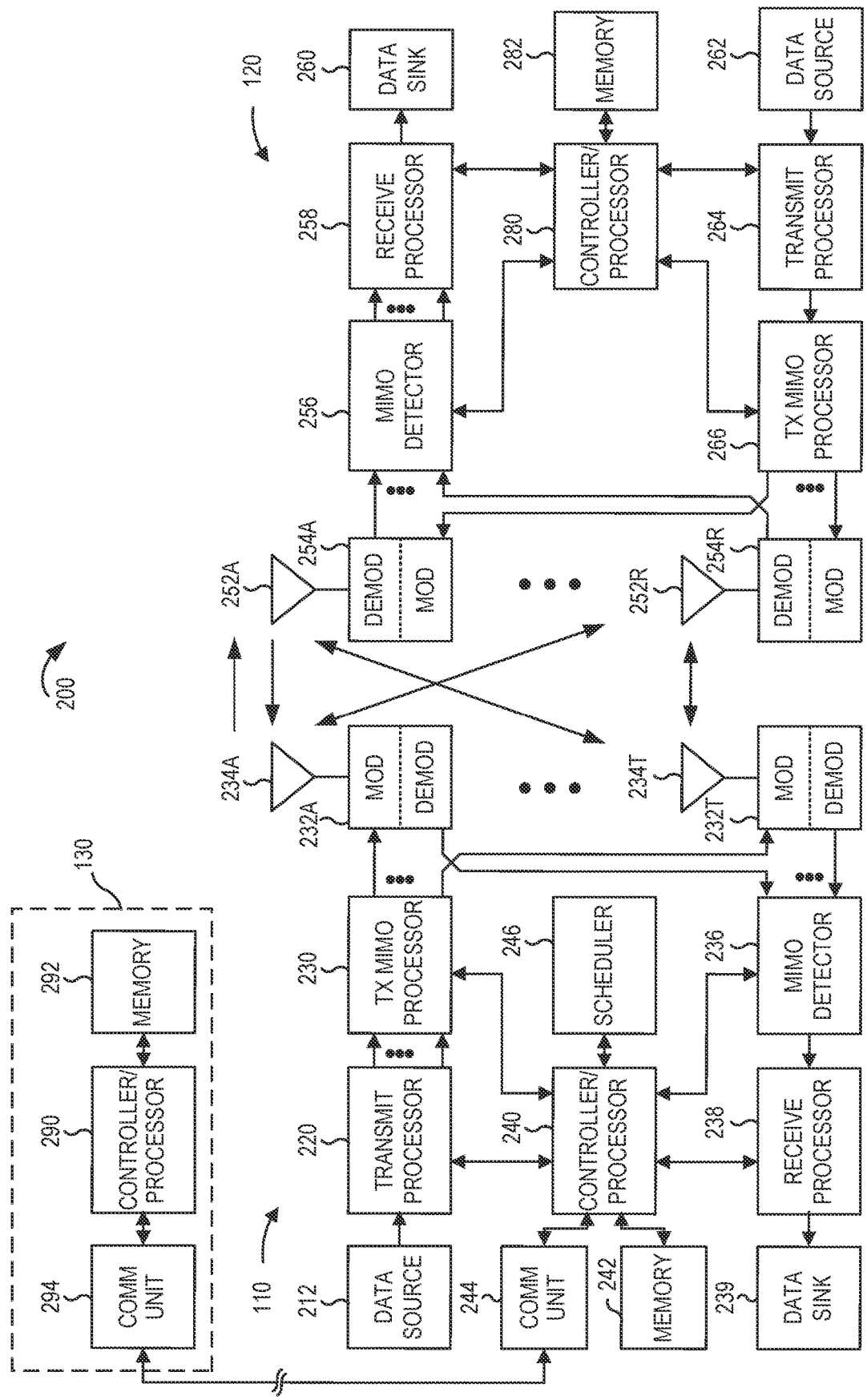
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with performing a power harvesting protocol, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 600 of FIG. 6, the process depicted by flowchart 700 of FIG. 7 or other processes as described herein, such as the processes described in FIGS. 3-5. The memories 242 and 282 may store data and program codes for BS 110 and UE 120, respectively. A scheduler 246 may schedule UEs for data transmission on the downlink, the uplink, or a combination thereof.

Figure 3:
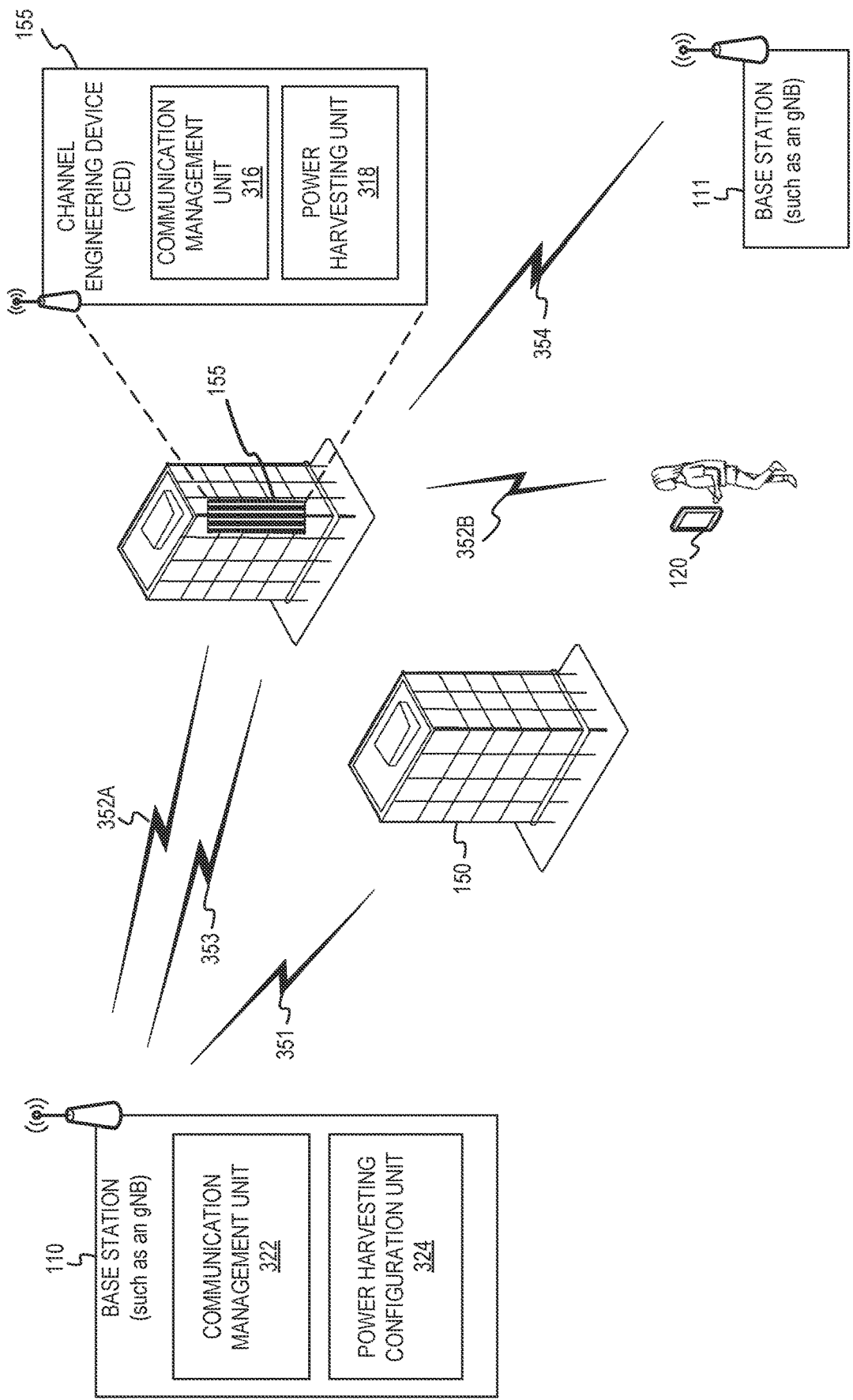
FIG. 3 shows a system diagram of an example wireless communication network including a BS and a channel engineering device (CED) that are configured to implement a power harvesting protocol for configuring the CED to perform power harvesting.
Figure 4:
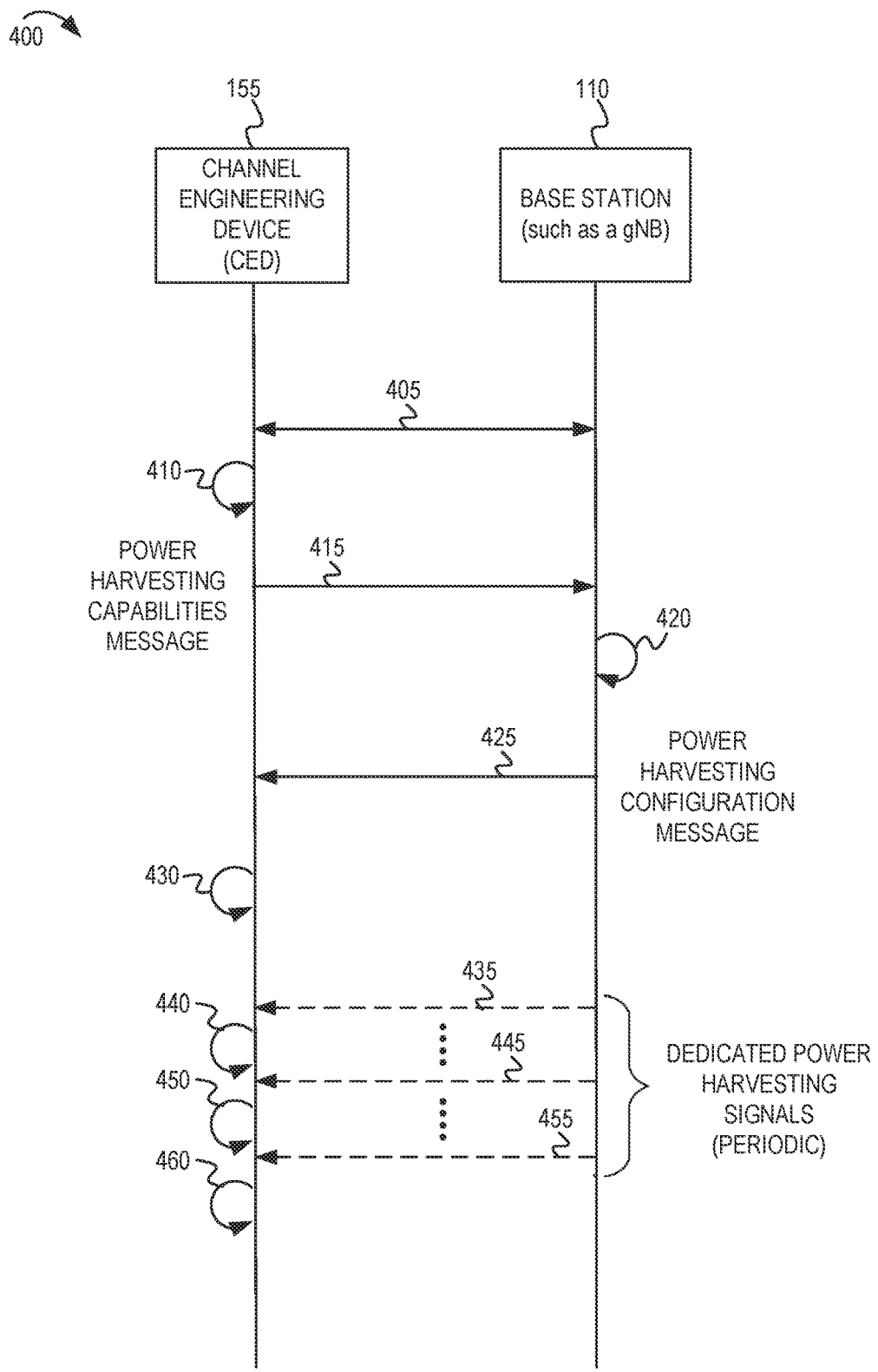
FIG. 4 shows an example message flow that shows a BS and a CED that are configured to implement a power harvesting protocol.
Figure 5:
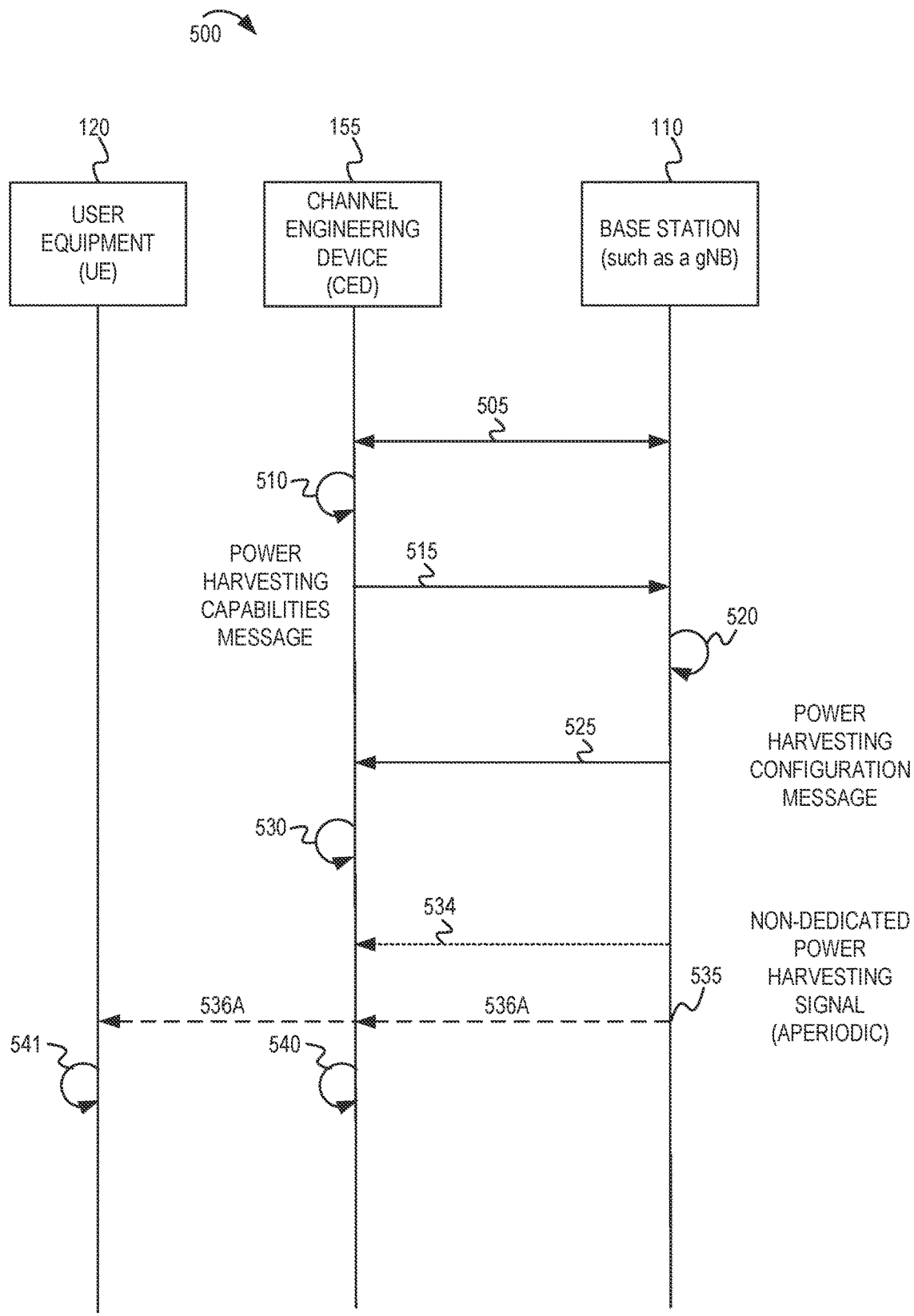
FIG. 5 shows another example message flow that shows a BS and a CED that are configured to implement a power harvesting protocol.
Figure 6:
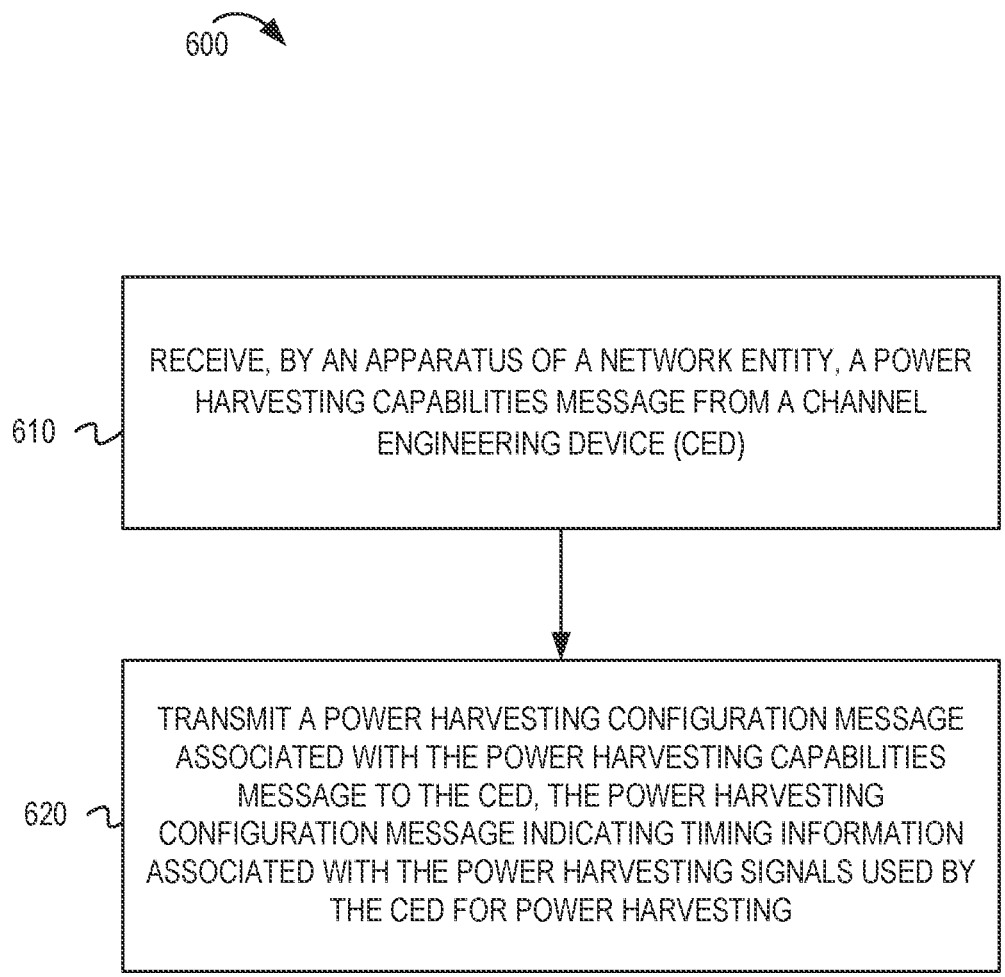
FIG. 6 depicts a flowchart with example operations performed by an apparatus of a BS for implementing a power harvesting protocol.
Figure 7:
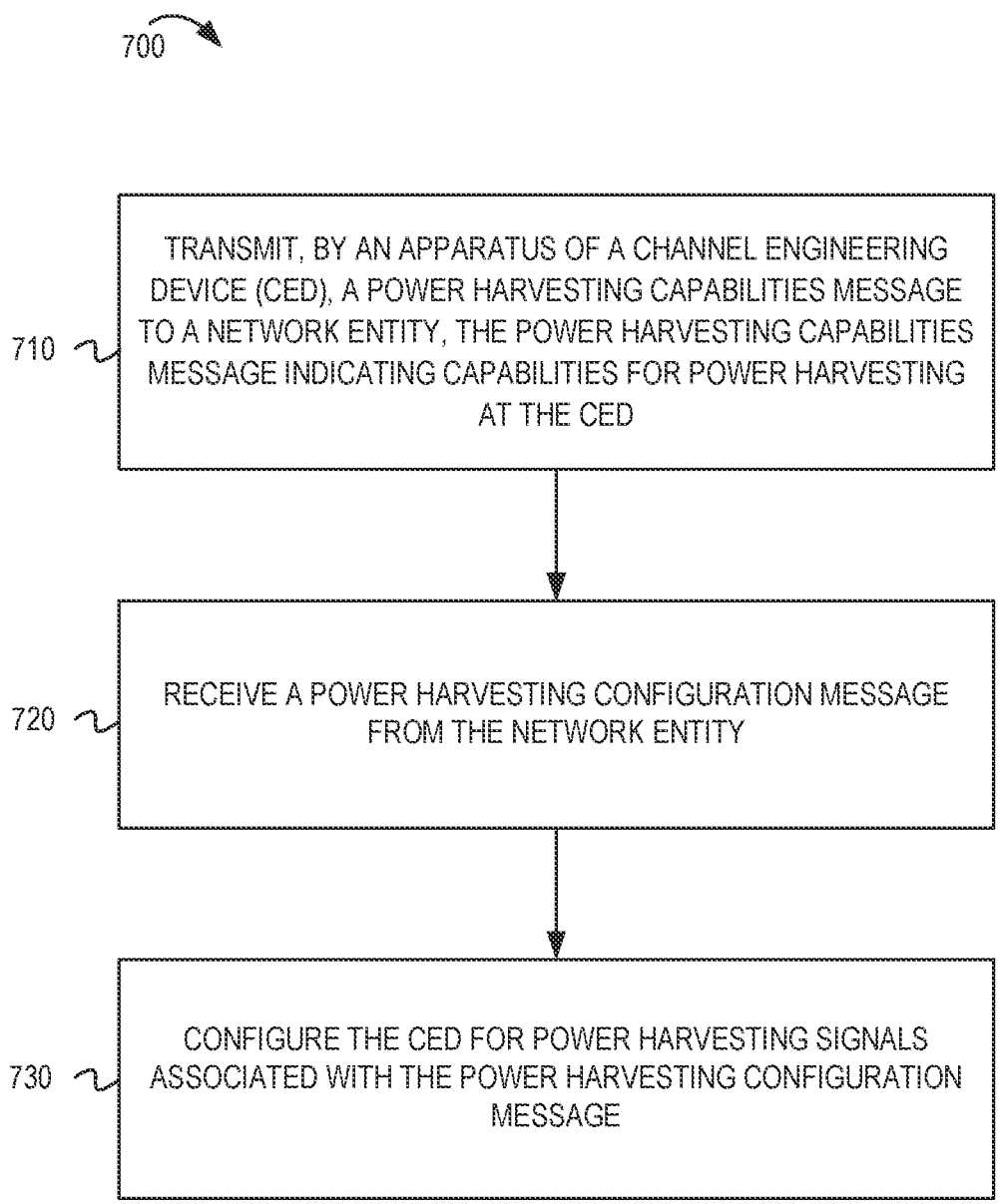
FIG. 7 depicts a flowchart with example operations performed by an apparatus of a CED for implementing a power harvesting protocol.

The stored program codes, when executed by the controller/processor 280 or other processors and modules at UE 120, may cause the UE 120 to perform operations described with respect to the process depicted by flowchart 600 of FIG. 6, the process depicted by flowchart 700 of FIG. 7 or other processes as described herein, such as the processes described in FIGS. 3-5. The stored program codes, when executed by the controller/processor 240 or other processors and modules at BS 110, may cause the BS 110 to perform operations described with respect to the process depicted by flowchart 600 of FIG. 6, the process depicted by flowchart 700 of FIG. 7 or other processes as described herein, such as the processes described in FIGS. 3-5. A scheduler 246 may schedule UEs for data transmission on the downlink, the uplink, or a combination thereof.

In some aspects, UE 120 may include means for performing the process depicted by flowchart 600 of FIG. 6, the process depicted by flowchart 700 of FIG. 7 or other processes as described herein, such as the processes described in FIGS. 3-5. In some aspects, such means may include one or more components of UE 120 described in connection with FIG. 2.

In some aspects, BS 110 may include means for performing the process depicted by flowchart 600 of FIG. 6, the process depicted by flowchart 700 of FIG. 7 or other processes as described herein, such as the processes described in FIGS. 3-5. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

FIG. 3 shows a system diagram of an example wireless communication network including a BS and a CED that are configured to implement a power harvesting protocol for configuring the CED to perform power harvesting. The wireless communication network 300 shown in FIG. 3 is based on the example wireless communication network 100 described in FIG. 1. The wireless communication network 300 also may be referred to as a wide area network (WAN) or a wireless wide area network (WWAN). The wireless communication network 300 may include one or more wireless nodes or network entities, such as a UE 120, a BS 110, a BS 111, and a CED 155. The UE 120 may be an example implementation of the UEs shown in FIGS. 1 and 2. The BS 110 and the BS 111 may each be an example implementation of the BSs shown in FIGS. 1 and 2. The CED 155 may be an example implementation of the CED shown in FIG. 1. As shown in FIG. 3, in some implementations, the BS 110 and the BS 111 may each be a gNB that may implement a 5G NR RAT. The 5G NR RAT may be designed to operate over a wide array of spectrum bands, for example, high-frequency bands such as millimeter wave (mmWave (mmW)) and sub-terahertz (sub-THz) bands. Although not shown for simplicity, the wireless communication network 300 may include one or more additional BSs, one or more additional UEs, and one or more additional CEDs.

In some implementations, the BS 110 may be an example of a wireless node or a network entity of the wireless communication network 300. The BS 110 may include a communication management unit 322 and a power harvesting configuration unit 324. The power harvesting configuration unit 324 may implement a power harvesting protocol. For example, the power harvesting configuration unit 324 may process power harvesting capabilities messages received from the CEDs and (such as the CED 155), and may generate power harvesting configuration messages for transmission to the CEDs, as further described herein. The communication management unit 322 may work in conjunction with the power harvesting configuration unit 324 to transmit power harvesting capabilities messages and power harvesting signals to the CEDs to perform power harvesting at the CEDs, as further described herein. Although not show in FIG. 3 for simplicity, in some implementations, a wireless node or a network entity of the wireless communication network 300, such as the BS 110, may can include multiple disaggregated constituent components, such as a central unit (CU), distributed unit (DU), and a radio unit (RU). Furthermore, although not shown in FIG. 3 for simplicity, the BS 111 also may include a communication management unit and a power harvesting configuration unit.

In some implementations, the CED 155 may include a communication management unit 316 and a power harvesting unit 318. The power harvesting unit 318 may implement a power harvesting protocol and may perform power harvesting at the CED 155. For example, the power harvesting unit 318 may generate power harvesting capabilities messages for transmission to the BSs (such as the BSs 110 and 111) and may process power harvesting configuration messages received from the BSs, as further described herein. The communication management unit 316 may work in conjunction with the power harvesting unit 318 to transmit power harvesting capabilities messages to the BSs and receive power harvesting signals from the BSs.

The BS 110 may communicate with one or more UEs, such as UE 120, in a coverage area using one or more directional beams. An obstacle 150, such as a building, may interfere with signals transmitted by the BS 110 from reaching the UE 120 via a LOS transmission. The BS 110 may configure a CED 155 to extend the coverage area by circumventing the obstacle 150. The CED 155 may configure one or more configuration settings of the CED 155 to control in which direction a metamaterial of the CED 155 directs received signal energy. The metamaterial of the CED 155 may focus received signal energy, reflect received signal energy, refract received signal energy, filter received signal energy, or any combination to enhance a communication link between the BS 110 and the UE 120. For example, the BS 110 may configure the CED 155 to reflect signal energy from a transmission 352A such that the reflected transmission 352B reflects towards the direction of the UE 120 and circumvents the obstacle 150. In some implementations, in addition to reflecting, refracting, and filtering signal energy, the CED 155 may absorb the signal energy associated with some of the signals received from the BSs of the wireless communication network 300, such as the BS 110 and the BS 111, in order to harvest power from the received signals. For example, the CED 155 may harvest power from the signals associated with the transmission 353 received from the BS 110 and from the signals associated with the transmission 354 received from the BS 111. The signals that are used to harvest power at the CEDs (such as the CED 155) may be referred to as power harvesting signals. Since CEDs are passive devices with nominal power requirements, performing power harvesting at a CED may provide sufficient power for normal operations and without having to access alternative power sources (such as solar power or battery power).

In some implementations, the BS 110 and the CED 155 may implement a power harvesting framework and protocol that includes power harvesting capabilities and configuration signaling to support power harvesting at the CED 155. The power harvesting capabilities and configuration signaling may include the CED 155 providing a power harvesting capabilities message to the BSs 110 and 111, and the BSs 110 and 111 responding with a power harvesting configuration message to configure the CED 155 for power harvesting. The power harvesting protocol also may include the BSs 110 and 111 providing dedicated signals and non-dedicated (or opportunistic) power harvesting signals to the CED 155 that will be used by the CED 155 for power harvesting.

In some implementations, the CED 155 may determine one or more parameters that indicate the power harvesting capabilities of the CED 155. For example, the one or more parameters may include one or more of a frequency parameter, an angle parameter, an aperture size parameter, and a duty cycle parameter. The CED 155 may provide a power harvesting capabilities message to the BS 110 that includes the one or more parameters. Similarly, the CED 155 may provide a power harvesting capabilities message to the BS 111 that includes the one or more parameters that indicate the power harvesting capabilities of the CED 155.

In some implementations, the frequency parameter may indicate one or more frequencies, or one or more frequency ranges, that may improve the signal energy absorption rate or efficiency of the metamaterial of the CED 155 for power harvesting. For example, the CED 155 may determine that a first frequency or a first frequency range has the highest signal energy absorption rate or efficiency for power harvesting, and thus the CED 155 may use the frequency parameter to indicate the first frequency or the first frequency range to the BS 110 (and to the BS 111). Based on the frequency parameter received from the CED 155, the BS 110 may use the first frequency (or a frequency within the first frequency range) to transmit power harvesting signals to the CED 155 for power harvesting. In some implementations, the angle parameter may indicate one or more angles, or one or more angle ranges, associated with the metamaterial of the CED 155 that improve the signal energy absorption rate or efficiency of the metamaterial of the CED 155 for power harvesting. For example, the CED 155 may determine that a first angle or a first angle range results in the highest signal energy absorption rate or efficiency for power harvesting, and thus the CED 155 may use the angle parameter to indicate the first angle (or the first angle range) to the BS 110 (and to the BS 111). Based on the angle parameter received from the CED 155 and the location and distance of the CED 155 from the BS 110, the BS 110 may transmit the power harvesting signals for power harvesting to the CED 155 in a direction that results in the CED 155 receiving the power harvesting signals at the first angle, or at an angle within the first angle range.

In some implementations, the aperture size parameter may indicate the aperture size associated with the metamaterial of the CED 155 that is used for signal energy absorption and power harvesting. For example, the metamaterial of the CED 155 may have a first aperture size, and thus the CED 155 may use the aperture size parameter to indicate the first aperture size to the BS 110 (and to the BS 111). Based on the aperture size parameter received from the CED 155 and the location and distance of the CED 155 from the BS 110, the BS 110 may determine which beam to use, and the width of the beam to use, to transmit the power harvesting signals to the CED 155 for power harvesting. In some implementations, the duty cycle parameter may indicate a minimum duty cycle to use for transmitting power harvesting signals to the CED 155 for power harvesting. For example, the minimum duty cycle may indicate the minimum time interval the CED 155 has to be charged by the signal energy of the transmitted power harvesting signals from the BS 110 without having to switch to an alternate power source for operation. If the BS 110 transmits power harvesting signals at the minimum duty cycle (or higher), the CED 155 will continue absorbing the signal energy from the received signals to harvest power without running out of the harvested power. For example, the minimum duty cycle may ensure that the amount of power used during the operation of the CED 155 does not exceed the amount of harvested power that is stored at the CED 155. The CED 155 may not have to use an alternate power source for operation if the CED 155 has sufficient harvested power. An alternate power source of a CED (such as the CED 155) that is not connected to the power grid may be solar power or battery power. The CED 155 may use the duty cycle parameter to indicate the minimum duty cycle to the BS 110 (and to the BS 111). Based on the duty cycle parameter received from the CED 155, the BS 110 may transmit power harvesting signals used for power harvesting to the CED 155 at the minimum duty cycle (or higher) to ensure the CED 155 harvests a sufficient amount of power where the CED 155 does not have to use an alternate power source.

The BS 110 may receive and process the power harvesting capabilities message from the CED 155. For example, the CED 155 may determine the one or more parameters included in the power harvesting capabilities message that indicate the power harvesting capabilities of the CED 155. The one or more parameters may include one or more of the frequency parameter, the angle parameter, the aperture size parameter, and the duty cycle parameter. The BS 110 may use the one or more parameters to generate and transmit the power harvesting signals to the CED 155 that are used for power harvesting, as described herein.

In some implementations, after receiving the power harvesting capabilities message from the CED 155, the BS 110 may determine timing information and frequency information associated with the power harvesting signals the BS 110 will transmit to the CED 155 for power harvesting based on the power harvesting capabilities message. In some implementations, the BS 110 may transmit a power harvesting configuration message to the CED 155 that indicates the timing information and the frequency information. The power harvesting configuration message may configure power harvesting configuration settings of the CED 155 to receive the power harvesting signals at certain times and via certain frequencies to perform the power harvesting at the CED 155. The timing information may configure the CED 155 to receive the power harvesting signals at certain times. The frequency information may configure the CED 155 to receive the power harvesting signals via certain frequencies. In some implementations, the timing information may indicate the time or the time interval the BS 110 may use to transmit the power harvesting signals to the CED 155. For example, the timing information may indicate which time slots and symbols may be used to transmit the power harvesting signals. In some implementations, the timing associated with the power harvesting signal also may ensure that the minimum duty cycle indicated by the duty cycle parameter is met. In some implementations, the frequency information may indicate the frequency the BS 110 may use to transmit the power harvesting signal. For example, the BS 110 may use one of the frequencies indicated by the frequency parameter of the power harvesting capabilities message received from the CED 155. Similarly, in some implementations, the BS 111 may determine timing information and frequency information associated with the power harvesting signals the BS 111 will transmit to the CED 155 for power harvesting, and may provide a power harvesting configuration message to the CED 155. In some implementation, the BSs 110 and 111 may transmit the power harvesting configuration message using at least one of a Radio Resource Control (RRC), a Media Access Control (MAC) Control Element (CE), or Downlink Control Information (DCI).

In some implementations, the power harvesting signals transmitted by the BSs 110 and 111 to the CED 155 for power harvesting may include dedicated power harvesting signals and non-dedicated power harvesting signals. The non-dedicated power harvesting signals also may be referred to as opportunistic power harvesting signals. The dedicated power harvesting signals may be transmitted to the CED 155 for the sole purpose of power harvesting at the CED 155. The non-dedicated (or opportunistic) power harvesting signals may be signals that are transmitted for purposes other than power harvesting, but the CED 155 may opportunistically receive the signals and absorb the signal energy to perform power harvesting at the CED 155. For example, non-dedicated (or opportunistic) power harvesting signals may include signals that are transmitted by the BS 110 for peak-to-average power ratio (PAPR) reduction. As another example, non-dedicated (or opportunistic) power harvesting signals may include signals that are opportunistically received by the CED 155 (such as based on the location of the CED 155) and that are not intended to be reflected by the CED 155. Since the signals are not intended to be reflected by the CED 155, the CED 155 may absorb the signal energy for power harvesting purposes. In some implementations, the dedicated and non-dedicated power harvesting signals may be periodic or aperiodic. For example, the BS 110 may transmit dedicated power harvesting signals to the CED 155 periodically. The BS 110 also may transmit dedicated power harvesting signals aperiodically as needed for power harvesting. For example, during a particular time period (such as a period of time when the CED 155 has been active for an extended amount of time), the CED 155 may be running low of harvested power, and the BS 110 may provide aperiodic signals to the CED 155 to harvest additional power. The non-dedicated power harvesting signals also may be periodic or aperiodic depending on the type and purpose of the signals. For example, PARP signals may be periodic since the BS 110 may transmit the signals used for PARP reduction periodically. Other signals that the CED 155 may opportunistically receive may be aperiodic, such as communication signals between a BS (such as BS 110) and a UE (such as UE 120).

In some implementations, after the power harvesting configuration message configures the CED 155 with the timing and frequency information associated with the power harvesting signals, the CED 155 may receive the power harvesting signals at the corresponding time and via the specified frequency. For example, the CED 155 may receive the power harvesting signals via one or more time slots (and the corresponding symbols) and via a first frequency. The metamaterial of the CED 155 may absorb the signal energy associated with the received power harvesting signals in order to harvest power.

FIG. 4 shows an example message flow that shows a BS and a CED that are configured to implement a power harvesting protocol. The message flow diagram 400 includes wireless nodes or wireless entities, such as the BS 110 and the CED 155 that are described in FIG. 3.

At 405, the CED 155 and the BS 110 may exchange messages to establish a wireless connection. The CED 155 may complete the initial attachment to the BS 110 after establishing the wireless connection with the BS 110.

At 410, the CED 155 may select, identify or determine one or more parameters that indicate the power harvesting capabilities associated with the CED 155. As described with reference to FIG. 3, the one or more parameters may include one or more of a frequency parameter, an angle parameter, an aperture size parameter, and a duty cycle parameter.

At 415, the CED 155 may generate and transmit a power harvesting capabilities message to the BS 110. The power harvesting capabilities message may include the one or more parameters that indicate the power harvesting capabilities associated with the CED 155.

At 420, the BS 110 may receive and process the power harvesting capabilities message. The BS 110 may process or decode the power harvesting capabilities message to read, identify or determine the one or more parameters included in the power harvesting capabilities message. The BS 110 may select, identify or determine timing information and frequency information associated with the power harvesting signals that the BS 110 will transmit to the CED 155 based on the one or more parameters included in the power harvesting capabilities message. For example, the BS 110 may select, identify, or determine the timing information associated with the power harvesting signals based on at least the duty cycle parameter. The BS 110 may select, identify, or determine the frequency information associated with the power harvesting signals based on at least the frequency parameter.

At 425, the BS 110 may generate and transmit a power harvesting configuration message to the CED 155. The power harvesting configuration message may include the timing information and the frequency information associated with the power harvesting signals that the BS 110 will transmit to the CED 155 for power harvesting.

At 430, the CED 155 may receive and process the power harvesting configuration message. The CED 155 may process or decode the power harvesting configuration message to read, identify or determine the timing information and the frequency information included in the power harvesting configuration message. The CED 155 may select, identify or determine the timing and frequency associated with the power harvesting signals that the BS 110 will transmit to the CED 155 based on the timing and frequency information included in the power harvesting configuration message. In some implementations, the CED 155 may use the timing and frequency information to configure power harvesting configuration settings of the CED 155, as described with reference to FIG. 3. The power harvesting signaling configuration may configure the CED 155 to receive one or more power harvesting signals at certain times and via a certain frequency.

At 435, 445, and 455, the BS 110 may transmit power harvesting signals to the CED 155. The BS 110 may transmit the power harvesting signals according to the timing and frequency information that the BS 110 provided to the CED 155. In some implementations, the power harvesting signals may be dedicated power harvesting signals that are transmitted to the CED 155 solely for power harvesting. In some implementations, the dedicated power harvesting signals may be transmitted periodically (as shown in FIG. 4). In some implementations, one or more dedicated power harvesting signals may be transmitted aperiodically.

At 440, 450, and 460, the CED 155 may receive each of the dedicated power harvesting signals and may absorb the signal energy of each of the dedicated power harvesting signals to perform power harvesting at the CED 155. In some implementations, the timing and frequency information included in the power harvesting configuration message received from the BS 110 may indicate to the CED 155 that the BS 110 will transmit the dedicated power harvesting signals having a certain timing and frequency. The CED 155 may configure the power harvesting configuration settings of the CED 155 based on the timing and frequency information to enable the CED 155 to receive the dedicated power harvesting signals. For example, after being configured by the timing and frequency information, the CED 155 may expect to receive the dedicated power harvesting signals at a certain time and frequency, and also may determine that the dedicated power harvesting signals will have a certain periodicity.

Additionally, or alternatively, the CED 155 may receive non-dedicated power harvesting signals from the BS 110, as discussed in FIG. 5. The message flow described herein in FIG. 4 also may be performed by the CED 155 and any other BS, such as the BS 111.

FIG. 5 shows another example message flow that shows a BS and a CED that are configured to implement a power harvesting protocol. The message flow diagram 500 includes one or more wireless nodes or wireless entities, such as the BS 110, the CED 155, and the UE 120 that are described in FIG. 3.

At 505, the CED 155 and the BS 110 may exchange messages to establish a wireless connection. The CED 155 may complete the initial attachment to the BS 110 after establishing the wireless connection with the BS 110.

At 510, the CED 155 may select, identify or determine one or more parameters that indicate the power harvesting capabilities associated with the CED 155. As described with reference to FIG. 3, the one or more parameters may include one or more of a frequency parameter, an angle parameter, an aperture size parameter, and a duty cycle parameter.

At 515, the CED 155 may generate and transmit a power harvesting capabilities message to the BS 110. The power harvesting capabilities message may include the one or more parameters that indicate the power harvesting capabilities associated with the CED 155.

At 520, the BS 110 may receive and process the power harvesting capabilities message. The BS 110 may process or decode the power harvesting capabilities message to read, identify or determine the one or more parameters included in the power harvesting capabilities message. The BS 110 may select, identify or determine timing information and frequency information associated with the power harvesting signals that the BS 110 will transmit to the CED 155 based on the one or more parameters included in the power harvesting capabilities message. For example, the BS 110 may select, identify or determine the timing information associated with the power harvesting signals based on at least the duty cycle parameter. The BS 110 may select, identify or determine the frequency information associated with the power harvesting signals based on at least the frequency parameter.

At 525, the BS 110 may generate and transmit a power harvesting configuration message to the CED 155. The power harvesting configuration message may include the timing information and the frequency information associated with the power harvesting signals that the BS 110 will transmit to the CED 155 for power harvesting.

At 530, the CED 155 may receive and process the power harvesting configuration message. The CED 155 may process or decode the power harvesting configuration message to read, identify or determine the timing information and the frequency information included in the power harvesting configuration message. The CED 155 may select, identify or determine the timing and frequency associated with the power harvesting signals that the BS 110 will transmit to the CED 155 based on the timing and frequency information included in the power harvesting configuration message. In some implementations, the CED 155 may use the timing and frequency information to configure the power harvesting configuration settings of the CED 155, as described in FIG. 3. The power harvesting signaling configuration may configure the CED 155 to receive one or more power harvesting signals at certain times and via a certain frequency.

At 535, the BS 110 may transmit a signal 536A to the UE 120. The signal 536A may be any type of communication signal. The CED 155 may be positioned at a location (such as a tower or building) that opportunistically receives some or all signals transmitted by the BS 110. For example, the CED 155 may be positioned at a location between the BS 110 and the UE 120. As another example, the CED 155 may be positioned at a location that receives signals via at least one of the beams from the BS 110. Thus, when the BS 110 transmits the signal 536A to the UE 120, the CED 155 may receive the signal 536A (or at least a portion of the signal 536A) via at least one of the beams from the BS 110. The signal 536A may be referred to as a non-dedicated or opportunistic power harvesting signal since the signal is transmitted to the UE 120 for a purpose other than power harvesting and the CED 155 opportunistically receives and absorbs the signal energy for power harvesting. The signal 536A also may be aperiodic since the signal is directed to the UE 120 and the BS 110 may not transmit the signal at a regular time interval. In some implementations, the timing and frequency information associated with the signal 536A may be provided in the power harvesting configuration message transmitted to the CED 155 (at 525). In some implementations, when the signal 536A is aperiodic and the BS 110 did not include the timing and frequency information in a previous power harvesting configuration message, the BS 110 may transmit a separate power harvesting configuration message (at 534) prior to the BS 110 transmitting the signal 536A that includes the timing and frequency information associated with the signal 536A. In some implementations, the CED 155 may receive non-dedicated or opportunistic power harvesting signals that are periodic or semi-periodic. For example, if a UE 120 is connected to the BS 110 for an extended amount of time and is receiving video streaming data, the signals received by the UE 120 and the CED 155 may be periodic or semi-periodic for the extended amount of time.

At 540, the CED 155 may receive the signal 536A and may absorb the signal energy of the signal 536A to perform power harvesting at the CED 155.

At 541, the UE 120 may receive and process the signal 536A. For example, the signal 536A may be a communication signal for a voice or video call.

Additionally, or alternatively, the CED 155 may receive dedicated power harvesting signals from the BS 110, as discussed in FIG. 4. The message flow described herein in FIG. 5 also may be performed by the CED 155 and any other BS, such as the BS 111.

FIG. 6 depicts a flowchart 600 with example operations performed by an apparatus of a wireless node or a network entity, such as a BS, for implementing a power harvesting protocol.

At block 610, the apparatus of the network entity may receive a power harvesting capabilities message from a CED.

At block 620, the apparatus of the network entity may transmit a power harvesting configuration message associated with the power harvesting capabilities message to the CED. The power harvesting configuration message may indicate timing information associated with power harvesting signals used by the CED for power harvesting.

FIG. 7 depicts a flowchart 700 with example operations performed by an apparatus of a CED for implementing a power harvesting protocol.

At block 710, the apparatus of the CED may transmit a power harvesting capabilities message to a network entity. The network entity may be a BS. The power harvesting capabilities message may indicate capabilities for power harvesting at the CED.

At block 720, the apparatus of the CED may receive a power harvesting configuration message from the network entity.

At block 730, the apparatus of the CED may configure the CED for power harvesting signals associated with the power harvesting configuration message.

Figure 8:
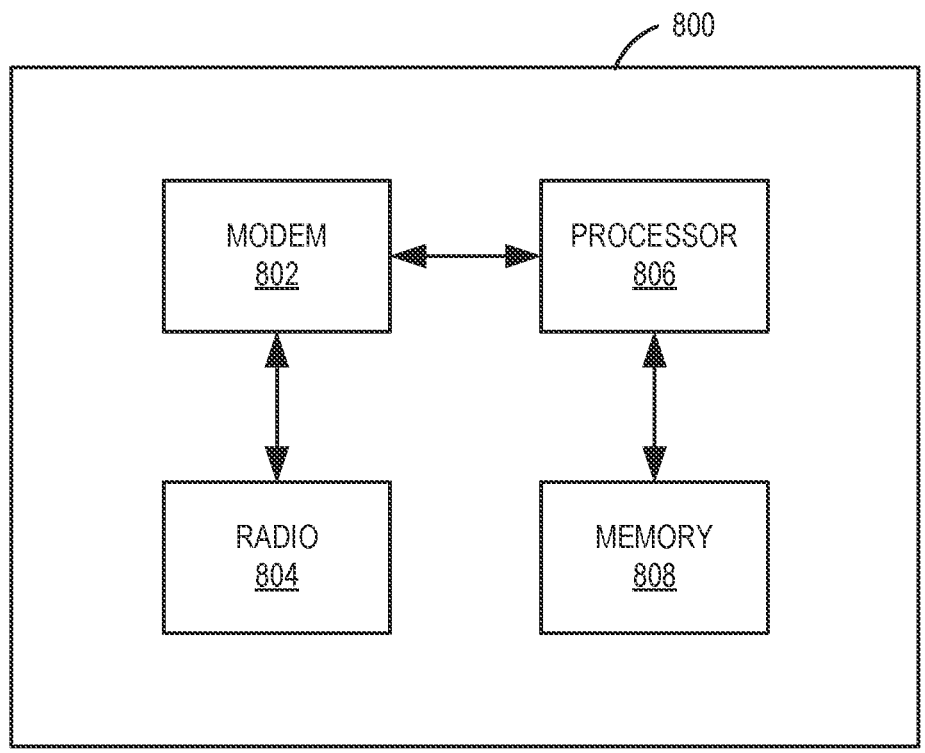
FIG. 8 shows a block diagram of an example wireless communication apparatus.

FIG. 8 shows a block diagram of an example wireless communication apparatus 800. In some implementations, the wireless communication apparatus 800 can be an example of a device for use in a UE, such as the UE 120 described with reference to FIG. 3. In some implementations, the wireless communication apparatus 800 can be an example of a device for use in a BS, such as the BS 110 described with reference to FIG. 3. The wireless communication apparatus 800 is capable of transmitting (or outputting for transmission) and receiving wireless communications.

The wireless communication apparatus 800 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 800 may include one or more modems 802. In some implementations, the one or more modems 802 (collectively "the modem 802") may include a WWAN modem (for example, a 3GPP 4G LTE or 5G compliant modem). In some implementations, the wireless communication apparatus 800 also includes one or more radios 804 (collectively "the radio 804"). In some implementations, the wireless communication apparatus 800 further includes one or more processors, processing blocks or processing elements (collectively "the processor 806") and one or more memory blocks or elements (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are mapped to points in a modulation constellation (using a selected MCS) to provide modulated symbols. The modulated symbols may be mapped to a number NS S of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 800 can include, or be coupled with, multiple transmit antennas (each with a corresponding transmit chain) and multiple receive antennas (each with a corresponding receive chain). The symbols output from the modem 802 are provided to the radio 804, which transmits the symbols via the coupled antennas. Similarly, symbols received via the antennas are obtained by the radio 804, which provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. In some implementations, the processor 806 may generally control the modem 802 to cause the modem to perform various operations described throughout.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 806 and the memory 808 of the wireless communication apparatus 800 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 806, the memory 808, and one or more other components of the wireless communication apparatus 800, such as the modem 802.

In some implementations, the processing system of a UE 120 may interface with other components of the UE 120, and may process information received from other components (such as inputs or signals), output information to other components, etc. For example, a chip or modem of the UE 120 (such as the wireless communication apparatus 800) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication apparatus 800) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 9:
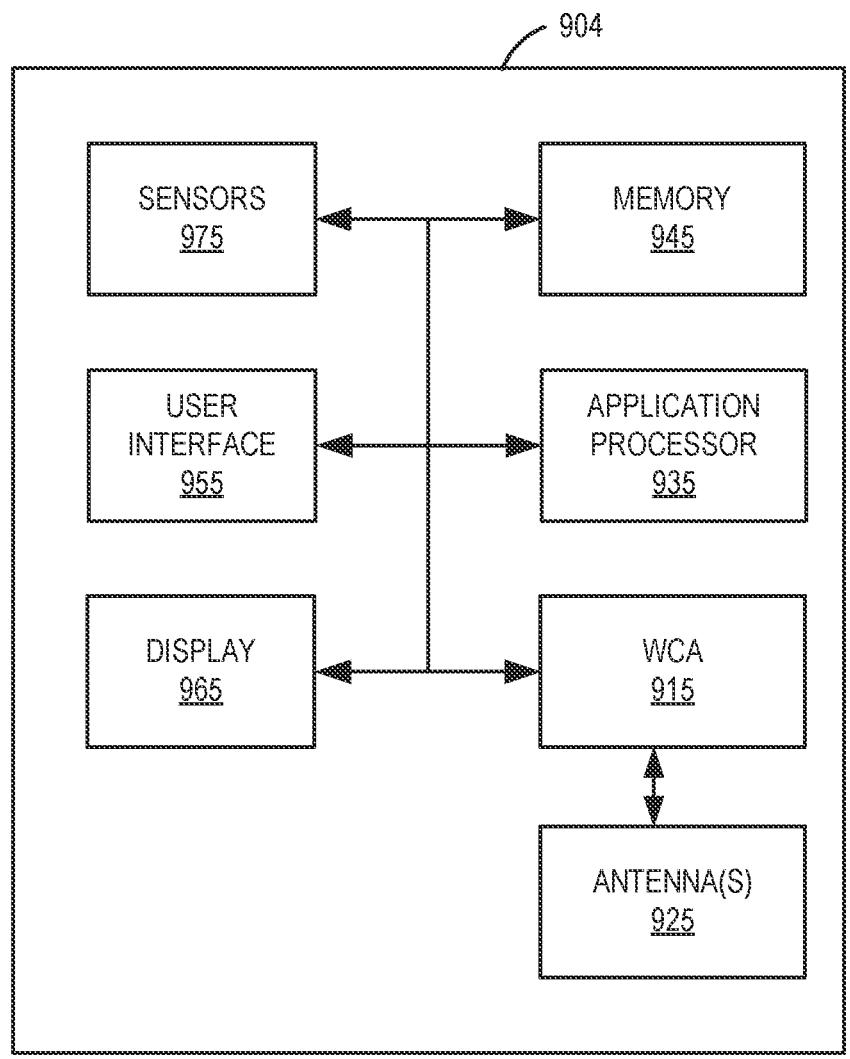
FIG. 9 shows a block diagram of an example mobile communication device.

FIG. 9 shows a block diagram of an example mobile communication device 904. For example, the mobile communication device 904 can be an example implementation of the UE 120 described herein. The mobile communication device 904 includes a wireless communication apparatus (WCA) 915. For example, the WCA 915 may be an example implementation of the wireless communication apparatus 800 described with reference to FIG. 8. The mobile communication device 904 also includes one or more antennas 925 coupled with the WCA 915 to transmit and receive wireless communications. The mobile communication device 904 additionally includes an application processor 935 coupled with the WCA 915, and a memory 945 coupled with the application processor 935. In some implementations, the mobile communication device 904 further includes a UI 955 (such as a touchscreen or keypad) and a display 965, which may be integrated with the UI 955 to form a touchscreen display. In some implementations, the mobile communication device 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 904 further includes a housing that encompasses the WCA 915, the application processor 935, the memory 945, and at least portions of the antennas 925, UI 955, and display 965.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One aspect of the subject matter described in this disclosure can be implemented in a method for wireless communication performed by an apparatus of a network entity. The method may include receiving a power harvesting capabilities message from a CED, and transmitting a power harvesting configuration message associated with the power harvesting capabilities message to the CED. The power harvesting configuration message may indicate timing information associated with power harvesting signals used by the CED for power harvesting.

Clause 2. The method of clause 1, where the power harvesting capabilities message may include one or more parameters that indicate capabilities for power harvesting at the CED.

Clause 3. The method of any one or more of clauses 1-2, where the one or more parameters may include one or more of a frequency parameter, an angle parameter, an aperture size parameter, and a duty cycle parameter.

Clause 4. The method of any one or more of clauses 1-3, where the power harvesting configuration message may further indicate frequency information associated with the power harvesting signals transmitted to the CED by the network entity to perform power harvesting at the CED.

Clause 5. The method of any one or more of clauses 1-4, where the timing information and the frequency information associated with the power harvesting signals nay include a time interval used by the network entity for transmitting the power harvesting signals to the CED, and a frequency used by the network entity for transmitting the power harvesting signals to the CED.

Clause 6. The method of any one or more of clauses 1-5, where the power harvesting signals may include periodic and aperiodic power harvesting signals.

Clause 7. The method of any one or more of clauses 1-6, where the power harvesting signals may include dedicated power harvesting signals and opportunistic power harvesting signals.

Clause 8. The method of any one or more of clauses 1-7, where transmitting the power harvesting configuration message to the CED may include transmitting the power harvesting configuration message using at least one of an RRC, a MAC-CE, or a DCI.

Clause 9. The method of any one or more of clauses 1-8, where transmitting the power harvesting configuration message to the CED may include transmitting the power harvesting configuration message to the CED prior to transmission of an aperiodic power harvesting signal associated with power harvesting.

Clause 10. The method of any one or more of clauses 1-9, further including receiving one or more parameters associated with power harvesting. The one or more parameters may be included in the power harvesting capabilities message and may indicate capabilities for power harvesting at the CED. The method may include generating the power harvesting configuration message based, at least in part, on the one or more parameters associated with power harvesting.

Clause 11. The method of any one or more of clauses 1-10, where the power harvesting signals may include dedicated power harvesting signals. The method may further include transmitting the dedicated power harvesting signals associated with the power harvesting configuration message to the CED.

Clause 12. Another aspect of the subject matter described in this disclosure can be implemented in a method for wireless communication performed by an apparatus of a CED. The method may include transmitting a power harvesting capabilities message to a network entity. The power harvesting capabilities message may indicate capabilities for power harvesting at the CED. The method may include receiving a power harvesting configuration message from the network entity, and configuring the CED for power harvesting signals associated with the power harvesting configuration message.

Clause 13. The method of clause 12, where the power harvesting capabilities message may include one or more parameters that indicate the capabilities for power harvesting at the CED.

Clause 14. The method of any one or more of clauses 12-13, where the one or more parameters may include one or more of a frequency parameter, an angle parameter, an aperture size parameter, and a duty cycle parameter.

Clause 15. The method of any one or more of clauses 12-14, where the power harvesting configuration message may indicate timing information and frequency information associated with the power harvesting signals received from the network entity to perform power harvesting at the CED.

Clause 16. The method of any one or more of clauses 12-15, where the timing information and frequency information associated with the power harvesting signals may include a time interval used by the network entity for transmitting the power harvesting signals to the CED, and a frequency used by the network entity for transmitting the power harvesting signals to the CED.

Clause 17. The method of any one or more of clauses 12-16, where receiving the power harvesting configuration message from the network entity may include receiving the power harvesting configuration message from the network entity prior to receipt of an aperiodic power harvesting signal associated with power harvesting.

Clause 18. The method of any one or more of clauses 12-17, further including receiving one or more of the power harvesting signals associated with the power harvesting configuration message from the network entity, and commencing power harvesting at the CED.

Clause 19. The method of any one or more of clauses 12-18, where receiving one or more of the power harvesting signals may include at least one of receiving one or more opportunistic power harvesting signals associated with the power harvesting configuration message from the network entity, and receiving one or more dedicated power harvesting signals associated with the power harvesting configuration message from the network entity.

Clause 20. The method of any one or more of clauses 12-19, where receiving one or more of the power harvesting signals may include at least one of receiving one or more periodic power harvesting signals associated with the power harvesting configuration message from the network entity, and receiving one or more aperiodic power harvesting signals associated with the power harvesting configuration message from the network entity.

Clause 21. Another aspect of the subject matter described in this disclosure can be implemented in an apparatus of a network entity for wireless communication. The apparatus of the network entity may include one or more processors configured to implement a power harvesting protocol. The apparatus of the network entity may include one or more interfaces configured to receive a power harvesting capabilities message from a CED, and transmit a power harvesting configuration message associated with the power harvesting capabilities message to the CED. The power harvesting configuration message may indicate timing information associated with power harvesting signals used by the CED for power harvesting.

Clause 22. The apparatus of any one or more of clauses 1-11 and clause 21, where the power harvesting capabilities message may include one or more parameters that indicate capabilities for power harvesting at the CED.

Clause 23. The apparatus of any one or more of clauses 1-11 and clauses 21-22, where the power harvesting configuration message may further indicate frequency information associated with the power harvesting signals transmitted to the CED by the network entity to perform power harvesting at the CED.

Clause 24. The apparatus of any one or more of clauses 1-11 and clauses 21-23, further including the one or more interfaces configured to receive one or more parameters associated with power harvesting. The one or more parameters may be included in the power harvesting capabilities message and may indicate capabilities for power harvesting at the CED. The apparatus may further include the one or more processors configured to generate the power harvesting configuration message based, at least in part, on the one or more parameters associated with power harvesting.

Clause 25. The apparatus of any one or more of clauses 1-11 and clauses 21-24, where the power harvesting signals may include dedicated power harvesting signals. The apparatus may further include the one or more interfaces configured to transmit the dedicated power harvesting signals associated with the power harvesting configuration message to the CED.

Clause 26. Another aspect of the subject matter described in this disclosure can be implemented in an apparatus of a CED for wireless communication. The apparatus of the CED may include one or more interfaces configured to transmit a power harvesting capabilities message to a network entity. The power harvesting capabilities message may indicate capabilities for power harvesting at the CED. The one or more interfaces may be configured to receive a power harvesting configuration message from the network entity. The apparatus of the CED may include one or more processors configured to configure the CED for power harvesting signals associated with the power harvesting configuration message.

Clause 27. The apparatus of any one or more of clauses 12-20 and clause 26, where the power harvesting capabilities message includes one or more parameters that indicate the capabilities for power harvesting at the CED.

Clause 28. The apparatus of any one or more of clauses 12-20 and clauses 26-27, where the power harvesting configuration message may indicate timing information and frequency information associated with the power harvesting signals received from the network entity to perform power harvesting at the CED.

Clause 29. The apparatus of any one or more of clauses 12-20 and clauses 26-28, where the timing information and frequency information associated with the power harvesting signals may include a time interval used by the network entity for transmitting the power harvesting signals to the CED, and a frequency used by the network entity for transmitting the power harvesting signals to the CED.

Clause 30. The apparatus of any one or more of clauses 12-20 and clauses 26-29, further including the one or more interfaces configured to receive one or more of the power harvesting signals associated with the power harvesting configuration message from the network entity, and the one or more processors configured to commence power harvesting at the CED.

Another aspect of the subject matter described in this disclosure can be implemented as a non-transitory computer-readable medium having stored therein instructions which, when executed by one or more processors of a CED, cause the CED to perform any one of the above-mentioned methods or features described herein.

Another aspect of the subject matter described in this disclosure can be implemented as a non-transitory computer-readable medium having stored therein instructions which, when executed by one or more processors of a network entity, cause the network entity to perform any one of the above-mentioned methods or features described herein.

Another aspect of the subject matter described in this disclosure can be implemented as an apparatus having means for implementing any one of the above-mentioned methods or features described herein.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by an apparatus of a network entity, comprising:
   receiving a power harvesting capabilities message from a channel engineering device (CED), wherein the power harvesting capabilities message includes one or more parameters selected by the CED that indicate capabilities for power harvesting at the CED, the one or more parameters including an aperture size parameter that indicates a first aperture size associated at least in part with a material of the CED;
   transmitting a power harvesting configuration message associated with the power harvesting capabilities message to the CED, the power harvesting configuration message indicating timing information associated with power harvesting signals used by the CED for power harvesting; and
   transmitting, one or more power harvesting signals to the CED using a beam, wherein the beam is based at least in part on receiving the aperture size parameter.

2. The method of claim 1, wherein the one or more parameters including the aperture size parameter, further includes one or more of:
   a frequency parameter,
   an angle parameter, and
   a duty cycle parameter.

3. The method of claim 1, wherein the power harvesting configuration message further indicates frequency information associated with the power harvesting signals transmitted to the CED by the network entity to perform power harvesting at the CED.

4. The method of claim 3, wherein the timing information and the frequency information associated with the power harvesting signals includes:
   a time interval used by the network entity for transmitting the power harvesting signals to the CED, and
   a frequency used by the network entity for transmitting the power harvesting signals to the CED.

5. The method of claim 3, wherein the power harvesting signals includes periodic and aperiodic power harvesting signals.

6. The method of claim 3, wherein the power harvesting signals includes dedicated power harvesting signals and opportunistic power harvesting signals.

7. The method of claim 3, wherein transmitting the power harvesting configuration message to the CED includes transmitting the power harvesting configuration message using at least one of a Radio Resource Control (RRC), a Media Access Control (MAC) Control Element (CE), or a Downlink Control Information (DCI).

8. The method of claim 3, wherein transmitting the power harvesting configuration message to the CED includes transmitting the power harvesting configuration message to the CED prior to transmission of an aperiodic power harvesting signal associated with power harvesting.

9. The method of claim 1, further comprising:
   receiving the one or more parameters associated with power harvesting; and
   generating the power harvesting configuration message in accordance with the one or more parameters associated with power harvesting.

10. The method of claim 1, wherein the power harvesting signals include dedicated power harvesting signals, further comprising:
    transmitting the dedicated power harvesting signals associated with the power harvesting configuration message to the CED.

11. A method for wireless communication performed by an apparatus of a channel engineering device (CED), comprising:
    transmitting a power harvesting capabilities message to a network entity, the power harvesting capabilities message indicating capabilities for power harvesting at the CED, wherein the power harvesting capabilities message includes one or more parameters selected by the CED that indicate capabilities for power harvesting at the CED, the one or more parameters including an aperture size parameter that indicates a first aperture size associated at least in part with a material of the CED;
    receiving a power harvesting configuration message from the network entity;
    configuring the CED for one or more power harvesting signals associated with the power harvesting configuration message; and
    receiving, the one or more power harvesting signals associated with the power harvesting configuration message from the network entity using a beam, wherein the beam is based at least in part on transmitting the aperture size parameter.

12. The method of claim 11, wherein the one or more parameters including the aperture size parameter, further includes one or more of:
a frequency parameter,
an angle parameter, and
a duty cycle parameter.

13. The method of claim 11, wherein the power harvesting configuration message indicates timing information and frequency information associated with the one or more power harvesting signals received from the network entity to perform power harvesting at the CED.

14. The method of claim 13, wherein the timing information and the frequency information associated with the one or more power harvesting signals includes:
a time interval used by the network entity for transmitting the one or more power harvesting signals to the CED, and
a frequency used by the network entity for transmitting the one or more power harvesting signals to the CED.

15. The method of claim 13, wherein receiving the power harvesting configuration message from the network entity includes receiving the power harvesting configuration message from the network entity prior to receipt of an aperiodic power harvesting signal associated with power harvesting.

16. The method of claim 11, further comprising:
commencing power harvesting at the CED based at least in part on receiving the one or more power harvesting signals associated with the power harvesting configuration message from the network entity.

17. The method of claim 11, wherein receiving the one or more power harvesting signals includes at least one of:
receiving one or more opportunistic power harvesting signals associated with the power harvesting configuration message from the network entity; and
receiving one or more dedicated power harvesting signals associated with the power harvesting configuration message from the network entity.

18. The method of claim 11, wherein receiving the one or more power harvesting signals includes at least one of:
receiving one or more periodic power harvesting signals associated with the power harvesting configuration message from the network entity; and
receiving one or more aperiodic power harvesting signals associated with the power harvesting configuration message from the network entity.

19. An apparatus of a network entity for wireless communication, comprising:
one or more processors configured to implement a power harvesting protocol; and
one or more interfaces configured to:
receive a power harvesting capabilities message from a channel engineering device (CED), wherein the power harvesting capabilities message includes one or more parameters selected by the CED that indicate capabilities for power harvesting at the CED, the one or more parameters including an aperture size parameter that indicates a first aperture size associated at least in part with a material of the CED;
transmit a power harvesting configuration message associated with the power harvesting capabilities message to the CED, the power harvesting configuration message indicating timing information associated with power harvesting signals used by the CED for power harvesting; and
transmit one or more power harvesting signals to the CED using a beam, wherein the beam is based at least in part on receiving the aperture size parameter.

20. The apparatus of claim 19, wherein the power harvesting configuration message further indicates frequency information associated with the power harvesting signals transmitted to the CED by the network entity to perform power harvesting at the CED.

21. The apparatus of claim 19, further comprising:
the one or more interfaces configured to receive the one or more parameters associated with power harvesting; and
the one or more processors configured to generate the power harvesting configuration message in accordance with the one or more parameters associated with power harvesting.

22. The apparatus of claim 19, wherein the power harvesting signals include dedicated power harvesting signals, further comprising:
the one or more interfaces configured to transmit the dedicated power harvesting signals associated with the power harvesting configuration message to the CED.

23. An apparatus of a channel engineering device (CED) for wireless communication, comprising:
one or more interfaces configured to:
transmit a power harvesting capabilities message to a network entity, the power harvesting capabilities message indicating capabilities for power harvesting at the CED, wherein the power harvesting capabilities message includes one or more parameters selected by the CED that indicate capabilities for power harvesting at the CED, the one or more parameters including an aperture size parameter that indicates a first aperture size associated at least in part with a material of the CED;
receive a power harvesting configuration message from the network entity;
receive one or more power harvesting signals associated with the power harvesting configuration message from the network entity using a beam, wherein the beam is based at least in part on transmitting the aperture size parameter; and
one or more processors configured to:
configure the CED for the one or more power harvesting signals associated with the power harvesting configuration message.

24. The apparatus of claim 23, wherein the power harvesting configuration message indicates timing information and frequency information associated with the one or more power harvesting signals received from the network entity to perform power harvesting at the CED.

25. The apparatus of claim 24, wherein the timing information and the frequency information associated with the one or more power harvesting signals includes:
a time interval used by the network entity for transmitting the one or more power harvesting signals to the CED, and
a frequency used by the network entity for transmitting the one or more power harvesting signals to the CED.

26. The apparatus of claim 23, further comprising:
the one or more processors configured to commence power harvesting at the CED.

27. The method of claim 1, wherein a width of the beam used for transmitting the one or more power harvesting signals is further based at least in part on receiving the aperture size parameter.

28. The method of claim 11, wherein a width of the beam used for receiving the one or more power harvesting signals is further based at least in part on transmitting the aperture size parameter.

29. The apparatus of claim 19, wherein a width of the beam used to transmit the one or more power harvesting signals is further based at least in part on receiving the aperture size parameter.

30. The apparatus of claim 23, wherein a width of the beam used to receive the one or more power harvesting signals is further based at least in part on transmitting the aperture size parameter.

* * * * *